(12) United States Patent
Hu et al.

(10) Patent No.: US 9,158,841 B2
(45) Date of Patent: Oct. 13, 2015

(54) METHODS OF EVALUATING SEMANTIC DIFFERENCES, METHODS OF IDENTIFYING RELATED SETS OF ITEMS IN SEMANTIC SPACES, AND SYSTEMS AND COMPUTER PROGRAM PRODUCTS FOR IMPLEMENTING THE SAME

(75) Inventors: Xiangen Hu, Germantown, TN (US); Zhiqiang Cai, Germantown, TN (US); Arthur C. Graesser, Memphis, TN (US); Scotty Craig, Chandler, AZ (US)

(73) Assignee: The University of Memphis Research Foundation, Memphis, TN (US)

( * ) Notice: Subject to any disclaimer, the term of this patent is extended or adjusted under 35 U.S.C. 154(b) by 0 days.

(21) Appl. No.: 13/523,442

(22) Filed: Jun. 14, 2012

(65) Prior Publication Data
US 2013/0138665 A1    May 30, 2013

Related U.S. Application Data

(60) Provisional application No. 61/497,364, filed on Jun. 15, 2011.

(51) Int. Cl.
*G06F 7/00* (2006.01)
*G06F 17/30* (2006.01)
*G06F 17/27* (2006.01)

(52) U.S. Cl.
CPC ...... *G06F 17/30731* (2013.01); *G06F 17/2785* (2013.01); *G06F 17/30675* (2013.01)

(58) Field of Classification Search
CPC .................................................. G06F 17/2785
USPC .......................................................... 707/749
See application file for complete search history.

(56) References Cited

U.S. PATENT DOCUMENTS 6,523,026 B1 *  2/2003  Gillis .................................... 1/1
7,483,892 B1 *  1/2009  Sommer et al. ...................... 1/1

* cited by examiner

*Primary Examiner* — Ajith Jacob
(74) *Attorney, Agent, or Firm* — Mintz Levin Cohn Ferris Glovsky and Popeo, P.C.; Peter F. Corless; Carolina E. Säve

(57) ABSTRACT

One aspect of the invention provides a method of evaluating semantic differences between a first item in a first semantic space and a second item in a second semantic space. The method includes: calculating a first ordered list of N nearest neighbors of the first item within the first semantic space; calculating a second ordered list of N nearest neighbors of the second item within the second semantic space; and computing a plurality of similarity measures between the first n nearest neighbors of the first item and the first n nearest neighbors of the second item, wherein n and N are positive integers and $1 \leq n \leq N$.

2 Claims, 6 Drawing Sheets

METHODS OF EVALUATING SEMANTIC DIFFERENCES, METHODS OF IDENTIFYING RELATED SETS OF ITEMS IN SEMANTIC SPACES, AND SYSTEMS AND COMPUTER PROGRAM PRODUCTS FOR IMPLEMENTING THE SAME

CROSS-REFERENCE TO RELATED APPLICATIONS

This application claims priority under 35 U.S.C. §119(e) to U.S. Provisional Patent Application Ser. No. 61/497,364, filed Jun. 15, 2011. The entire contents of this application is hereby incorporated by reference herein.

STATEMENT REGARDING FEDERAL SUPPORT

This invention was made with government support under Grant No. 0106965 from the National Science Foundation and Grant No. N61339-07-20001 from the Department of Defense. The U.S. Government has certain rights in this invention.

BACKGROUND

The semantics of words and phrases in any language can be digitized in the form of real-valued vectors, i.e. bounded-dimensional vectors with only a finite number of nonzero entries. Such representations of words and phrases are called "semantic vectors" and the collection of all such vectors is called a "semantic space."

Researchers and practitioners have used such representations in information retrieval, semantic similarity analysis, scoring of text quality, and analyses of discourse cohesion. Over the past 20 years, needs have grown to the point where a systematic method is necessary to evaluate and optimize semantic spaces.

SUMMARY OF THE INVENTION

One aspect of the invention provides a method of evaluating semantic differences between a first item in a first semantic space and a second item in a second semantic space. The method includes: calculating a first ordered list of N nearest neighbors of the first item within the first semantic space; calculating a second ordered list of N nearest neighbors of the second item within the second semantic space; and computing a plurality of similarity measures between the first n nearest neighbors of the first item and the first n nearest neighbors of the second item, wherein n and N are positive integers and $1 \leq n \leq N$.

This aspect of the invention can have a variety of embodiments. The plurality of similarity measures can include one or more selected from the group consisting of: combinatorial similarity, permutational similarity, and quantitative similarity. The plurality of similarity measures can be each selected from a uniform type of similarity measure. The plurality of similarity measures can be selected from different types of similarity measures. The plurality of similarity measures can be equal to N. A similarity measure can be computed for each iteration of n for $1 \leq n \leq N$.

The first item can be selected from the group consisting of: words, phrases, and sentences. The second item can be selected from the group consisting of: words, phrases, and sentences.

Another aspect of the invention provides a computer program product comprising computer-usable medium having control logic stored therein for causing a computer to perform a method of evaluating semantic differences between a first item in a first semantic space and a second item in a second semantic space. The control logic includes: first computer readable program code means for causing the computer to calculate a first ordered list of N nearest neighbors of the first item within the first semantic space; second computer readable program code means for causing the computer to calculate a second ordered list of N nearest neighbors of the second item within the second semantic space; and third computer readable program code means for causing the computer to compute a plurality of similarity measures between the first n nearest neighbors of the first item and the first n nearest neighbors of the second item, wherein n and N are positive integers and $1 \leq n \leq N$.

This aspect of the invention can have a variety of embodiments. The plurality of similarity measures can be equal to N. A similarity measure can be computed for each iteration of n for $1 \leq n \leq N$.

Another aspect of the invention provides a system for performing a method of evaluating semantic differences between a first item in a first semantic space and a second item in a second semantic space. The system can include a processor configured to calculate a first ordered list of N nearest neighbors of the first item within the first semantic space; calculate a second ordered list of N nearest neighbors of the second item within the second semantic space; and compute a plurality of similarity measures between the first n nearest neighbors of the first item and the first n nearest neighbors of the second item, wherein n and N are positive integers and $1 \leq n \leq N$.

This aspect of the invention can have a variety of embodiments. The plurality of similarity measures is equal to N. A similarity measure can be computed for each iteration of n for $1 \leq n \leq N$.

Another aspect of the invention provides a method of identifying a first set of items from a first semantic space that are semantically related to a second set of items from a second semantic space. The method includes: generating an induced semantic space for the first semantic space, the induced semantic space represented as a square matrix in which each matrix entry (i, j) is a numeric representation of an association strength between item i and item j in the first set of items; setting matrix entries below a defined replacement threshold to 0; selecting e items having the highest value entries from the j columns; ranking the e items by association strength entry values; selecting n items having the highest value entries from the e items; calculating a similarity measure between each of the n items selected from the first semantic space and each of the n items selected from the second semantic space; and calculating an aggregate similarity value from the similarity measures between each of the n items selected from the first semantic space and each of the n items selected from the second semantic space.

This aspect of the invention can have a variety of embodiments. The similarity measure can include one or more selected from the group consisting of: combinatorial similarity, permutational similarity, and quantitative similarity.

Another aspect of the invention provides a computer program product comprising computer-usable medium having control logic stored therein for causing a computer to perform a method of identifying a first set of items from a first semantic space that are semantically related to a second set of items from a second semantic space. The control logic includes: first computer readable program code means for causing the computer to generate an induced semantic space for the first semantic space, the induced semantic space represented as a square matrix in which each matrix entry (i, j) is a numeric representation of an association strength between item i and item j in the first set of items; second computer readable program code means for causing the computer to set matrix entries below a defined replacement threshold to 0; third computer readable program code means for causing the computer to select e items having the highest value entries from the j columns; fourth computer readable program code means for causing the computer to rank the e items by association strength entry values; fifth computer readable program code means for causing the computer to select n items having the highest value entries from the e items; sixth computer readable program code means for causing the computer to calculate a similarity measure between each of the n items selected from the first semantic space and each of the n items selected from the second semantic space; and seventh computer readable program code means for causing the computer to calculate an aggregate similarity value from the similarity measures between each of the n items selected from the first semantic space and each of the n items selected from the second semantic space.

This aspect of the invention can have a variety of embodiments. The similarity measure can include one or more selected from the group consisting of: combinatorial similarity, permutational similarity, and quantitative similarity.

Another aspect of the invention provides a system for identifying a first set of items from a first semantic space that are semantically related to a second set of items from a second semantic space. The system includes a processor configured to: generate an induced semantic space for the first semantic space, the induced semantic space represented as a square matrix in which each matrix entry (i, j) is a numeric representation of an association strength between item i and item j in the first set of items; set matrix entries below a defined replacement threshold to 0; select e items having the highest value entries from the j columns; rank the e items by association strength entry values; select n items having the highest value entries from the e items; calculate a similarity measure between each of the n items selected from the first semantic space and each of the n items selected from the second semantic space; and calculate an aggregate similarity value from the similarity measures between each of the n items selected from the first semantic space and each of the n items selected from the second semantic space.

This aspect of the invention can have a variety of embodiments. The similarity measure can include one or more selected from the group consisting of: combinatorial similarity, permutational similarity, and quantitative similarity.

FIGURES

For a fuller understanding of the nature and desired objects of the present invention, reference is made to the following detailed description taken in conjunction with the accompanying drawing figures wherein:

FIG. 1 depicts the 25 nearest neighbors for the word "life" for latent semantic analysis (LSA) spaces for the third grade, the sixth grade, the ninth grade, the twelfth grade, and the first year of college;

Figure 8:
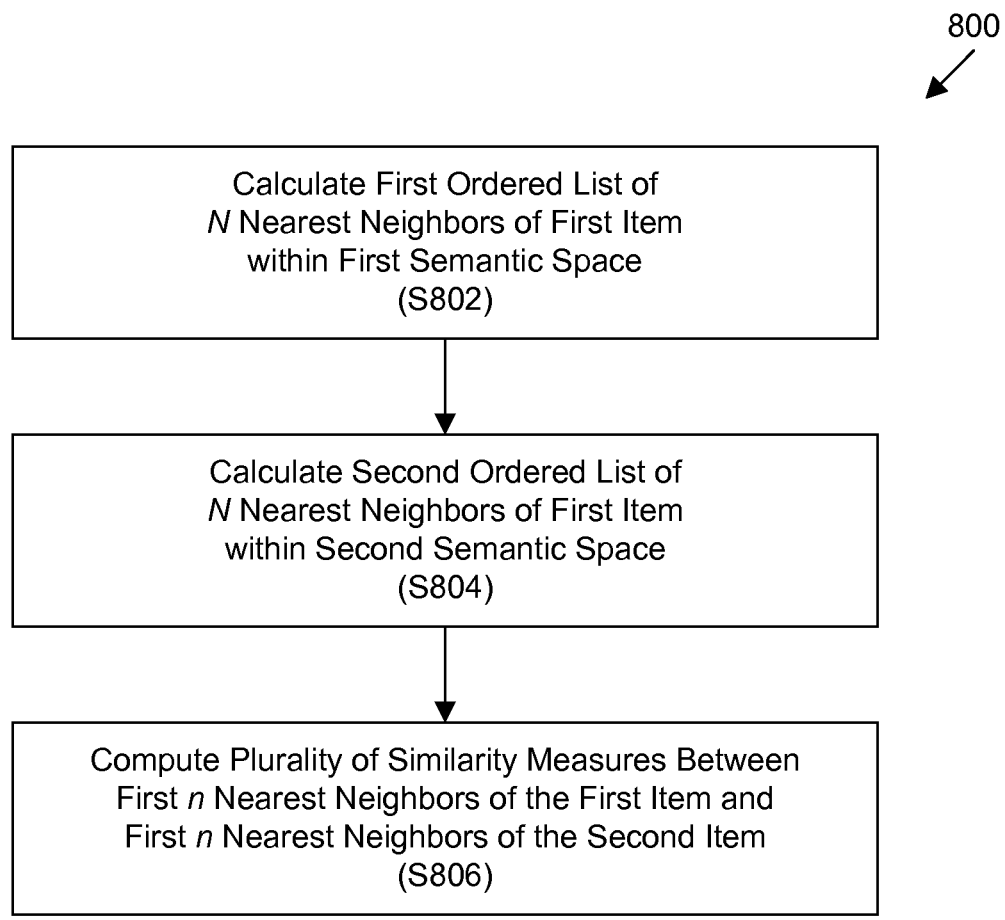
Figure 9:
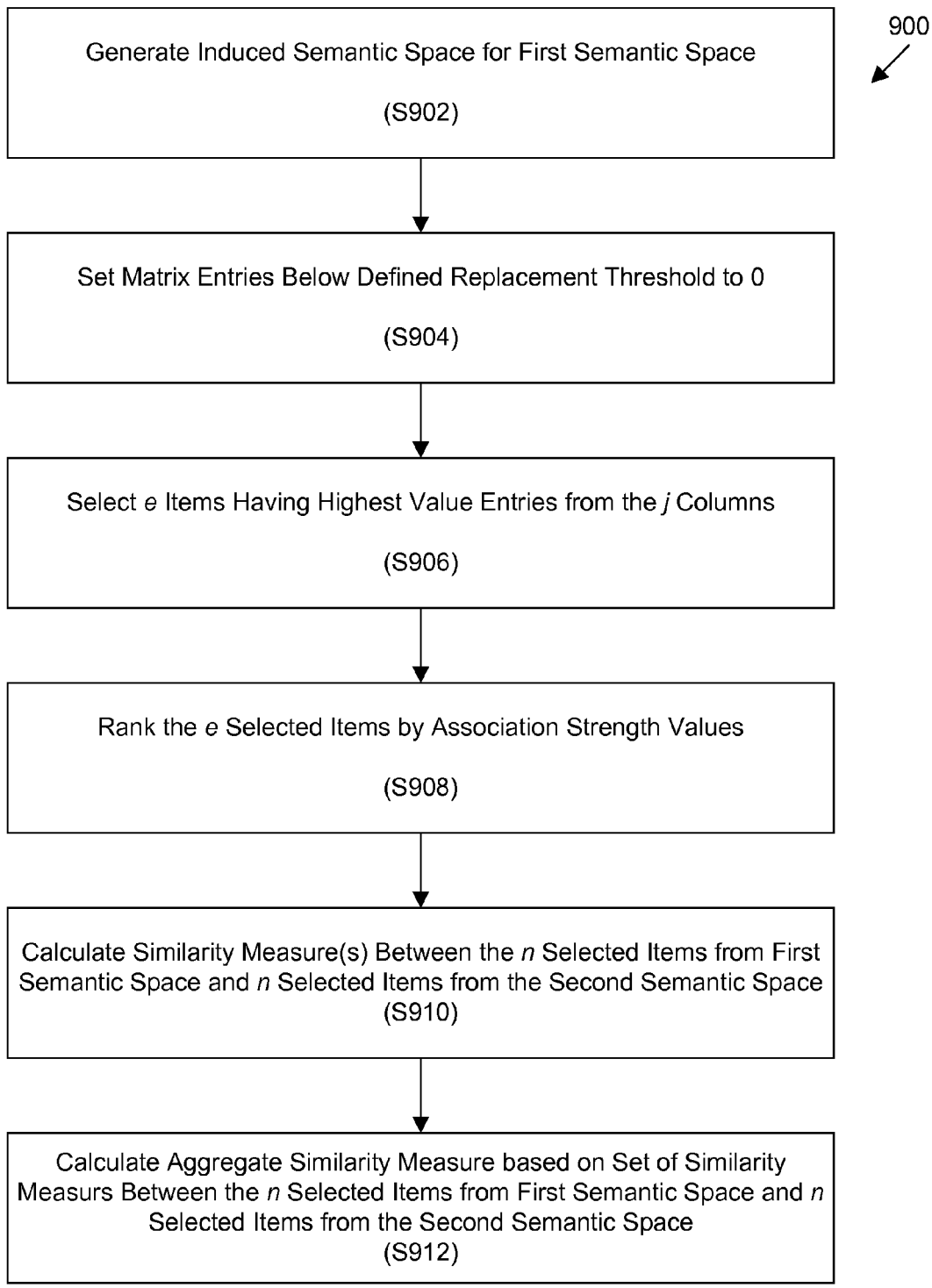

FIG. 8 depicts a method of evaluating semantic differences between a first item in a first semantic space and a second item in a second semantic space according to an embodiment of invention; and FIG. 9 depicts a method of identifying a first set of items from a first semantic space that are semantically related to a second set of items from a second semantic space according to an embodiment of invention.

DESCRIPTION OF THE INVENTION

Embodiments of the invention enable automatic evaluation of semantic differences between semantic spaces. The invention will aid in the development of improved semantic-based search engines, more efficient and effective intelligent tutoring systems, and better tools for examining and improving the quality of written tools.

The Development of Semantic Spaces

Since vector space models were proposed in the early 1970's, many different versions have been implemented. All of these models build semantic representations of word co-occurrences within linguistic corpora using statistical regularities between the words. The models are generally organized into two basic types: context word models and context region models. The main difference between the two types of models is the distributional method used during indexing.

In "context word models," similarity is determined by computing a word-by-word co-occurrence matrix. This method compares the frequency of the co-occurrence of words within a section or "window" of a text corpus. Hyperspace Analogue to Language (HAL), as described in C. Burgess, "From simple associations to building blocks of language modeling meaning in memory with the HAL model," 30 Behavior Research Methods, Instruments, and Computers 188-98 (1998), is a typical example of this type of model. HAL counts the frequency that each context word precedes or succeeds a word of interest within the moving window. HiDEx (High Dimensional Explorer), as described C. Shaoul & C. Westbury, "Word frequency effects in high-dimensional co-occurrence models: A new approach" 38(2) Behavior Research Methods 190-95 (2006), is a context word model similar to HAL that counts the co-occurrences of a target word and a context word, and then divides by the frequency of the target word in the corpus. Several other models that could be included in this category are COALS, as described in D. L. T. Rohde et al., "An improved model of semantic similarity based on lexical co-occurrence" (2005), available http://www.cnbc.cmu.edu/~plaut/papers/abstracts/RohdeGonnerman-PlautSUB-CogSci.COALS.html; and contextual similarity models such as CS-LL Contextual Similarity, as described in T. Dunning, "Accurate methods for the statistics of surprise and coincidence," 19(1) Computational Linguistics 61-74 (1993) and CS-LO as described in W. Lowe, "Topographic maps of semantic space" (2000) (doctoral thesis) (University of Edinburgh); W. Lowe, "Towards a theory of semantic space," in "Proceedings of the 23$^{rd}$ Conference of the Cognitive Science Society" 576-81 (J. Moore & K. Stenning, eds. 2001); and W. Lowe & S. McDonald, "The direct route: Mediated priming in semantic space," in "Proceedings of the 22$^{nd}$ Conference of the Cognitive Science Society" 806-11 (L. Glietman & A. Joshi, eds. 2000).

"Context region models" assign similarity based on a word-by-context region matrix, where a context region may be a sentence, paragraph, or document. Models in this category include: the topics model, as described in T. L. Griffiths et al., "Topics in semantic representation," 114(2) Psychological Review 211-44 (2007) and M. Steyvers & T. L. Griffiths, "Probabilistic topic models," in "Handbook of latent semantic analysis," 427-48 (T. K. Landauer et al., eds. 2007); BEAGLE, as described in (M. N. Jones & D. J. Mewhort, "Representing word meaning and order information in a compoasite holographic lexicon," 114(1) Psychol. Rev. 1-37 (2007); and latent semantic analysis (LSA), as described in T. Landauer & S. Dumais, "A solution to Plato's problem: The latent semantic analysis theory of the acquisition, induction, and representation of knowledge," 104 Psychol. Rev. 211-40 (1997) and "Handbook of latent semantic analysis" (T. K. Landauer et al., eds. 2007).

LSA is, by far, the best known and most widely implemented member of the two families of semantic space models. Thus, LSA is utilized as the primary example herein. However, the invention described herein is equally applicable to all semantic space models.

Applications of Semantic Spaces

Applications of semantic spaces have been seen in three major areas: advanced information retrieval (AIR), advanced learning environments (ALE), and computerized text analysis (CTA). The key elements of these applications are vector representations of semantics and associated "distance measure" between the vectors.

Advanced Information Retrieval (AIR)

Matching target and query semantically in AIR is one of the advances achieved by the development of semantic spaces. LSA was developed to improve the quality of AIR, and due to its success, other applications of LSA were developed.

It is easy to show that AIR using semantic spaces is a natural extension of string matching. The quality of AIR based on semantic spaces depends on the quality of semantic spaces used. In some cases, better AIR can be achieved when semantic spaces are used in combination with other methods.

The inventors have used AIR in the Human Use Regulatory Affairs Advisor (HURAA), a project funded by the Office of Naval Research in the late 1990's as discussed in A. C. Graesser et al., "Learning about the ethical treatment of human subjects in experiments on a web facility with a conversational agent and ITS components," in "Intelligent Tutoring Systems 2002" 972-81 (S. A. Cerri et al., eds. 2002) and A. C. Graesser, "Coh-Metrix: Analysis of text on cohesion and language," 36 Behavioral Research Methods, Instruments, and Computers 193-202 (2004).

In the HURAA project, ethics principles for human subject protection are encoded semantically for subsequent retrieval when queried by the user. The search begins by encoding a query semantically in the same semantic space and subsequently by matching the query vector with the vectors of alternative ethics principles. The high matching principle is identified as the relevant principle for the query. A satisfactory outcome was observed in the matches even when the semantic space used was not within the general domain of the ethics content.

Computerized Text Analysis (CTA)

One representative example of CTA using semantic spaces is the Coh-Metrix project funded by the Institute of Education Sciences of the U.S. Department of Education and discussed in A. C. Graesser, "Coh-Metrix: Analysis of text on cohesion and language," 36 Behavioral Research Methods, Instruments, and Computers 193-202 (2004) and D. S. McNamara et al., "Optimizing LSA measures of cohesion," in "Handbook of Latent Semantic Analysis" 379-400 (T. Landauer et al., eds. 2007).

A semantic space is used to encode the semantics of a large corpus of documents and to analyze new texts. Then semantic similarity is used to measure semantic cohesion between adjacent sentences, paragraphs, and documents, as well as nonadjacent text segments. Using semantic spaces in CTA has been one of the major elements in most applications of semantic spaces beyond text analysis per se. This includes the ALE applications discussed below.

Advanced Learning Environment (ALE)

An example application of semantic spaces in ALE is AutoTutor, which was developed at University of Memphis. In AutoTutor, as described in P. Wiemer-Hastings et al., "Approximate natural language understanding for an intelligent tutor," in "Proceedings of the American Association for Artificial Intelligence" 535-42 (1999), A. C. Graesser, et al. "Using LSA in AutoTutor: Learning through mixed initiative dialogue in natural language," in "Handbook of latent semantic analysis" 243-62 (T. Landauer et al., eds. 2007), and B. A. Olney, "AutoTutor: a conversation tutoring environment," in "Proceedings of the 40th Annual meeting of the Association for Computational Linguistics: Demonstration Abstracts" 108-09 (2002).

As in any intelligent tutoring system, the problems of (i) interpreting the learners' answers and (ii) determining what the learners know are key problems that must be solved for tutoring to be effective. Indeed, these problems are related. One can infer what the learners know through their answers as well as using the current model of what the learners know to interpret their answers. This duality is implicit in the Auto-Tutor software, which uses LSA to solve both problems simultaneously.

In the AutoTutor software, learning content is aggregated into problem scenarios or deep-level questions that require about a paragraph of information to answer correctly. Therefore, the problem of assessment becomes a problem of comparing the state of the learner's answer to the ideal answer to the problem, which was previously generated by a subject matter expert. In the AutoTutor software, this comparison, as well as the instruction, is carried out piecemeal so that at any one time, only one aspect of the ideal answer is being discussed by the learner and the tutor. To assess whether the learner has mastered that aspect, AutoTutor uses LSA and other semantic processing algorithms to compare the student's answer with its corresponding ideal answer aspect. Thus, the AutoTutor software computes the semantic similarity between what the students have said and what they are expected to say to assess what they know. Similarly, the students' cognitive model is composed of the semantic similarity between what they have said and all of the ideal answer aspects. This information is used to dynamically sequence content based on an individual student's progress. In both cases, the key feature of LSA is that it compares the semantic similarity between two sets of words: the ideal answer aspect and each student's answer. To accomplish this feat, LSA projects words into a space, such that the semantic similarity can be measured as the distance between words.

Semantic spaces are used in other ALEs such as the reading strategy trainer iSTART described in D. S. McNamara et al., "Optimizing LSA measures of cohesion," in "Handbook of Latent Semantic Analysis" 379-400 (T. Landauer et al., eds. 2007), Summary Street described in E. Kintsch et al., "Summary Street®: Computer-Guided Summary Writing," in "Handbook of Latent Semantic Analysis" 263-278 (T. Landauer et al., eds. 2007), and the Intelligent Essay Grader described in L. Streeter, "Automated Tools for Collaborative Learning Environments," in "Handbook of Latent Semantic Analysis" 279-91 (T. Landauer et al., eds. 2007). All of these applications are similar to the AutoTutor software in that semantic spaces are used to compute semantic similarity between free-form texts.

The Complexity of Creating and Evaluating Semantic Spaces

The process of creating and evaluating a semantic space involves several critical steps. For example, the creation of an LSA space involves:

1. Selection of a domain—This is determined by the purpose of the semantic space. For example, a semantic space may be used as a semantic engine for a tutoring system of a specific domain or for grading essays in a given subject
2. Selection of corpora—This step involves collecting and selecting relevant texts for the given domain. For example, if the domain is physics, there is a choice of textbooks, research articles, or both.
3. Processing of raw material—It is possible that collected material will contain not only text, but also graphics (bitmap of a scanned document). Even if the materials are texts, there may be strings that are tags and attributes (e.g., in HTML files). This step also includes inserting proper sentences or paragraph markers. In some cases, researchers may need to decide the size of the document at this step.
4. Obtaining word-document frequency matrix A—At this step, one needs to decide the value of
each entry of the matrix as a function of global weight $g_i$ (weight of the word i), local weight $l_j$ (weight of document j), and the frequency of word i in document j, $f_{ij}$. Word-document frequency matrix A usually takes the form $$(A)_{ji} = g_i l_j f_{ij} \quad (1)$$

Note that $g_i$, $l_j$, and $f_{ij}$ can take different forms.

5. Decomposition of the word-document matrix and representing words by vectors—The matrix A can be processed in different ways. Even though singular value decomposition (SVD) is the most popular method, one could use others to represent words as vectors. For example, low-rank orthogonal decomposition (ULV or URV) was suggested as alternative for SVD as discussed in M. W. Berry & R. D. Herm, "Low-rank orthogonal decompositions for information retrieval applications," 3(4) Numerical linear algebra with applications 301-327 (1996).
6. Dimensional reduction—This step determines how many dimensions are sufficient for a vector representation. It is reported in T. Landauer & S. Dumais, "A solution to Plato's problem: The latent semantic analysis theory of the acquisition, induction, and representation of knowledge," 104 Psychol. Rev. 211-40 (1997) and D. Dennis, "How to use the LSA web site," in "Handbook of latent semantic analysis" 57-70 (T. K. Landauer et al, eds. 2007) that 300 is the best for some applications. However, there are cases in which more dimensions (e.g., 300 to 500) are used as discussed in A. C. Graesser, et al. "Using LSA in AutoTutor: Learning through mixed initiative dialogue in natural language," in "Handbook of latent semantic analysis" 243-62 (T. Landauer et al., eds. 2007).
7. Processing of the vectors—This step decides: (1) if the first dimension of the word vector needs to be removed, and (2) if the dimensions need to be weighted as discussed in Hu et al., "LSA: The first dimension and dimensional weighting," in "Proceedings of the 25th Annual Conference of the Cognitive Science Society" 1-6 (R. Alterman & D. Hirsh, eds. 2003).

After these steps, each word is represented as an n-dimensional vector, where n is a number chosen in step 7.

There are also other ways to use the vectors to compute similarity. For example, a similarity computation can be performed. The cosine function is the default similarity measure for LSA. Other similarity measures can also be used as discussed in Hu et al., "Strengths, limitations, and extensions of LSA," in "Handbook of Latent Semantic Analysis" 401-26 (T. Landauer et al., eds. 2007).

In another example, similarity values are computed between documents. The value can utilized by itself or one can use the value and consider the size (number of words) of the document as discussed in Hu et al., "Strengths, limitations, and extensions of LSA," in "Handbook of Latent Semantic Analysis" 401-26 (T. Landauer et al., eds. 2007).

Other semantic spaces, such as HAL, as discussed in C. Burgess, "From simple associations to building blocks of language modeling meaning in memory with the HAL model," 30 Behavior Research Methods, Instruments, and Computers 188-98 (1998), and Non-Latent Similarity (NLS), as discussed in Cai et al., "NLS: A Non-Latent Similarity Algorithm," in "Proceedings of the 26th Annual Meeting of the Cognitive Science Society" 180-85 (K. D. Forbus et al., eds. 2004), are different from LSA in some of the steps (e.g., step 5).

In general, many parameters need to be determined for any semantic space before it is evaluated by human experts. Evaluation of LSA spaces with given sets of parameters is conducted by comparing LSA with human experts on some benchmark task. For example, one could use LSA to compute similarity between texts and then use humans to judge the appropriateness of the outcome (usually using correlational analysis or kappa scores). However, human experts' evaluations of semantic spaces is time consuming. Simple calculation shows that it is impossible for human experts to evaluate semantic spaces with all of the possible combinations of parameters. The invention provides a computational solution.

Open Questions in Semantic Spaces

The preceding sections have highlighted some of the open questions regarding semantic spaces and their corresponding use in learning environments. However, there are also a number of more subtle open questions that this invention addresses. The large number of open questions and the lack of integrative theory illustrate the need for this invention if the science and technology of semantic spaces for learning environments are to progress.

Weighting—Previous research in information retrieval has shown the effects of weighting experimentally for a particular corpus.

Dimensions—Previous research has investigated the effects of retained dimensions experimentally, but only for particular corpora. Moreover, the properties of the individual dimensions themselves have not been adequately analyzed. The first dimension of LSA spaces is always large and positive, supporting the argument that dimensions should be examined individually for optimal results.

Resolution—All previous research in LSA has used term-document matrices. However, there has been no exploration of what should count as a term or a document. Therefore, it is an open question whether a term should be a word or a sequence of words (n-gram). Likewise, it is an open question whether a document should be a sentence, a paragraph, or some larger unit.

Corpora—There is very little research on the corpus properties needed to make a good semantic space. For example, there could be an ideal ratio of content words to documents. Some early results suggest that it is better to use a small, high quality corpus than a larger, less focused one, but these results are not conclusive.

Preprocessing—Previous work in information retrieval has investigated the impact of stemming, but there has not been adequate research on the effect of analogous preprocessing on semantic spaces. For example, the effect of separating morphemes such as "didn't" into "did not" for semantic spaces is unknown.

Similarity—Although the similarity measure itself (the cosine, typically) has not been systematically evaluated for semantic spaces, there are two common defects in the knowledge that has been gained. First, for historical reasons, the similarity measure has frequently been investigated under the domain of information retrieval. Information retrieval is a markedly different problem than the semantic similarity judgments required by advanced learning environments. Thus, it is not clear whether an optimal practice for information retrieval would be optimal for learning environments. Second, evaluations have often been addressed in an ad hoc manner, so as to produce a set of optimal parameters for a specific problem rather than any kind of theoretical framework. As such, their utility is rather limited when considering semantic spaces in general. On the other hand, this invention enables the application of an integrative theory that links the mathematical properties of semantic spaces to experimental results. This theory underlying this invention will bridge results created in disparate domains and lay a foundation for future breakthroughs in semantic spaces.

Semantic Spaces

Embodiments of invention generate Induced Semantic Structures (ISS) for a semantic space. ISS enables comparisons between semantic spaces. Such comparison are operationally defined within the framework and are numerical.

Definition of Semantic Spaces

A vector-based semantic space contains five components:
1. a set of words $X_0 = \{x_1, \ldots, x_N\}$;
2. a hierarchy of layers, $X_1, \ldots, X_M$, where an element in the set $X_i$ is a finite-ordered array of elements in $X_{i-1}$ (i=1, ... M);
3. a vector representation for elements in each of the layers;
4. a measure of similarity between elements within each of the layers; and
5. maps from lower-level representations to higher-level representations.

As discussed in X. Hu et al., "Similarity between semantic spaces," in "Proceedings of the 27th Annual Meetings of the Cognitive Science Society" 995-1000 (B. Bara, ed. 2005), vector representations of elements in each layer means that for any x in $X_i$, there exists a real-valued vector $E_i(x) \in \Re$ with a finite number of nonzero entities. The similarity measure between two elements at the same level means that there is a mapping that maps a pair of such vectors to a unique real number.

W. Lowe, "Towards a theory of semantic space," in "Proceedings of the $23^{rd}$ Conference of the Cognitive Science Society" 576-581 (J. Moore & K. Stenning, eds. 2001) proposed a similar structure with four components. The difference that arises between Lowe and this definition is that this definition considers not only the word level, but also all other levels with assumed mapping from lower layers to higher layers. To understand the above definition, consider the five language entities (five layers), namely, "word," "phrase," "sentence," "paragraph," and "document." Each corresponds to a different layer: $X_1$ is a set of phrases; $X_2$ is a set of sentences, etc. For every element, there is a vector representation. A limited dimensionality is not specified for the vector representation; instead, the model assumes that there is a bounded-dimensional vector with only a finite number of nonzero entries.

To understand items 5 and 4 of the earlier definition, one can take LSA as a simple example, where the semantic vector of a sentence is simply a vector summation of the vectors of the words in the sentence. Furthermore, the similarity between two words (or two sentences) is a function of the two word (sentence) vectors. Item 5 of the definition emphasizes the relations between different layers. Similar relations can be seen from LSA, where the computation of similarity between documents is a function of the vectors of the words.

Semantic spaces such as LSA satisfy the following three assumptions:

Hierarchical assumption—Semantics of different levels of a language entity can be represented differently, but semantics of a higher-level language entity is computed as a function of the semantics of its lower-level language entities. The smallest semantic units are words, for example, "this," "is," "a," "big," "table." A phrase is an ordered array of words. for example, "big table." A sentence is an ordered array of words and phrases, for example, "This is a big table." A paragraph is an ordered array of sentences, for example, "This is a big table. It was broken." A document is an ordered array of paragraphs.

Representational assumption—Semantics of any level of language entities can be represented numerically or algebraically.

Computational assumption—Semantic relations between any two same-level language entities can be numerically measured. Semantics of a higher-level language entity is computed as a function of semantics of its lower-level language entities. There exists a (numerical) semantic similarity measure that measures any two items at the lowest level.

With the above assumptions, this framework further assumes that the semantics of any term is defined by its (numerical) relations with other terms in the same semantic space. The formalized definition of semantic spaces entails the above assumptions.

Induced Semantic Structure (ISS) of a Semantic Space

Using the framework provided above, semantic spaces can be examined at a level that is beyond the level of representations. For example, one could examine LSA spaces with different representations (e.g., 300 or 500 dimensions), or even with different corpora (e.g., sixth- or ninth-grade texts from the Touchstone Applied Science Associates (TASA) corpus). Such comparison between semantic spaces is made possible by the concept of induced semantic structure (ISS)

within this framework. ISS is the partial ordering of relations between elements in the same level, such as words, phrases, or sentences. It is assumed that there is a similarity measure between any two elements within the same level. That means that any two items can be compared. Given any element, (partial) order can be assigned to all other elements in the same level.

ISS can also be constructed with a given subset of items in a given layer. For example, ISS for a set of K physics glossary items in a given semantic space is a K×K matrix where each element $s_{ij}$ is the similarity (computed from the semantic space) between glossary items i and j, where i, j=1, . . . , K. Note that ISS contains similarity between items in a given semantic space without the vector representation. This means that one could have an ISS for the K glossary items from different semantic spaces built with completely different methods as long as the K glossary items are in both semantic spaces. Because of this special property of ISS, the invention enables examination of semantic relations between different semantic spaces.

Measurements Between Semantic Spaces

With the concept of ISS, further assumptions can be made within the framework provided herein. These assumptions serve as the theoretical foundation for the similarity measures of semantic spaces.

- The meaning of a word is embedded in its relations to other words. As an illustrative example depicted in FIG. 1, the word "life" has different near neighbors for different LSA spaces.
- If a given word is shared in different semantic spaces, the relation between the semantics of the word in different semantic spaces is a function of the corresponding near neighbors. Near neighbors are just one row of the ISS.
- The relations between any two semantic spaces are a function of the relations of the semantic structures of all the shared words.

With the above assumptions, it is possible to measure similarity between semantic spaces at three different levels: combinatorial similarity, permutational similarity, and quantitative similarity.

Figure 1:
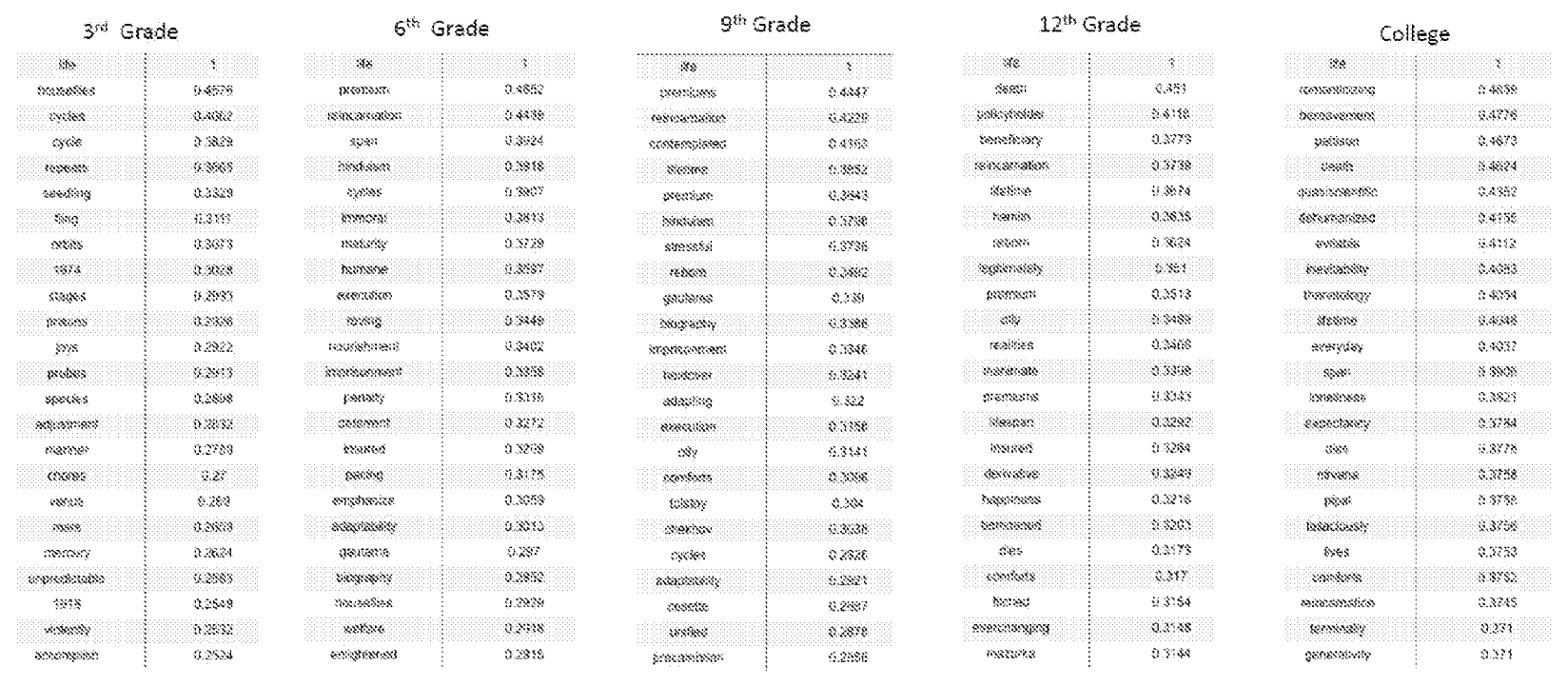

Combinatorial similarity (CS)—Based on the concept of induced semantic structure, for each element, there will be a corresponding ordering relation imposed on other elements in the same level. Combinatorial similarity between any two elements is computed as a function of the number of overlap elements for the top (say, T) items. This obviously depends on the number of elements considered. It can simply be considered as the overlap of the top T elements in the near neighbors. The computation of CS is very simple. For a given T, CS is computed as the size of the intersection divided by the size of the union. For example, with T=25 consider nearest neighbors for "life" in the third- and sixth-grade LSA spaces as depicted in FIG. 1; the CS is $$\frac{5}{25} \approx 0.11.$$

Figure 2:
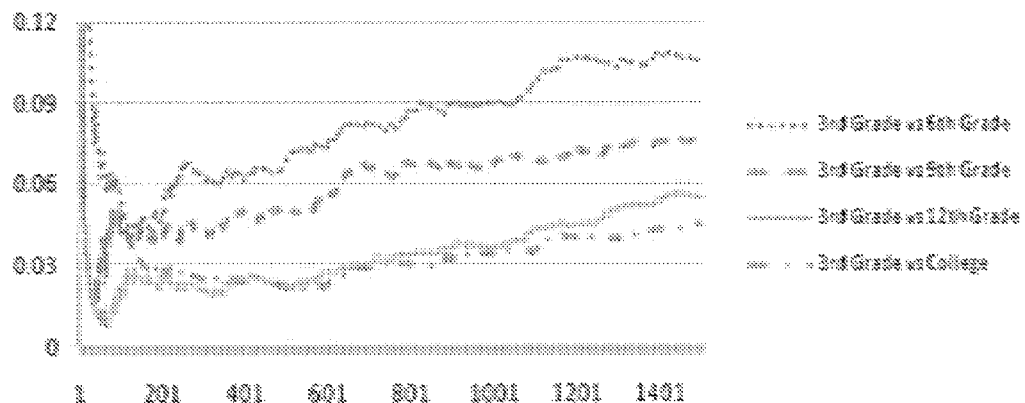
FIG. 2 depicts the computational similarity between different corpuses for the top T elements for T≤1500 according to an embodiment of the invention.
Figure 3:
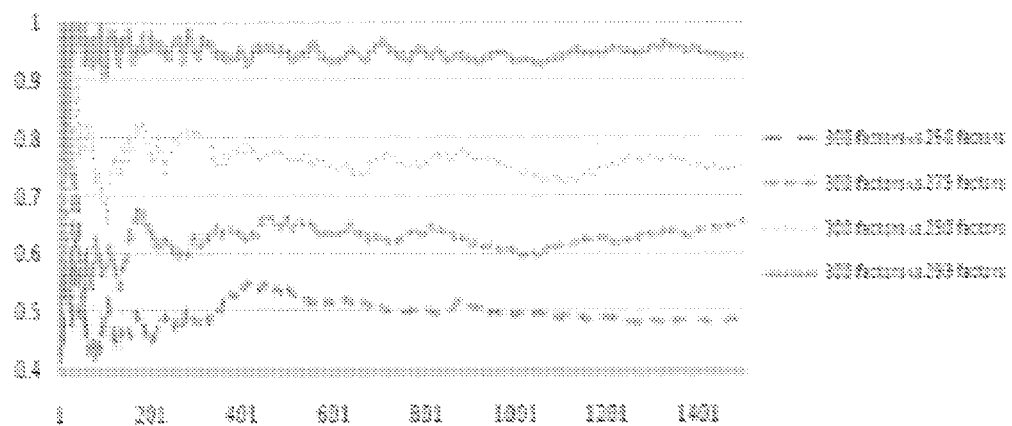
FIG. 3 depicts the computational similarity between for different factors for the top T elements for T≤1500 according to an embodiment of the invention.

If T is increased from 1 to the total number of words, CS can be characterized in the form of a curve. FIGS. 2 and 3 depict such curves for T≤1500.

Figure 4:
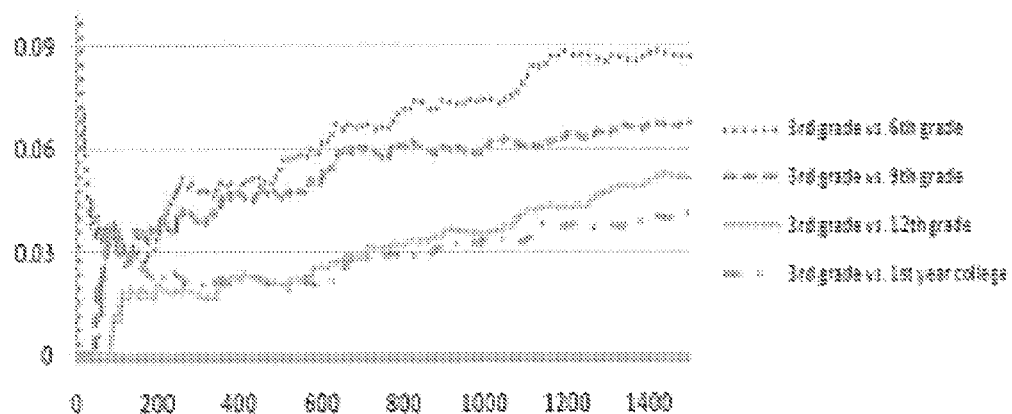
FIG. 4 depicts the permutational similarity between different corpuses for the top T elements for T≤1500 according to an embodiment of the invention.
Figure 5:
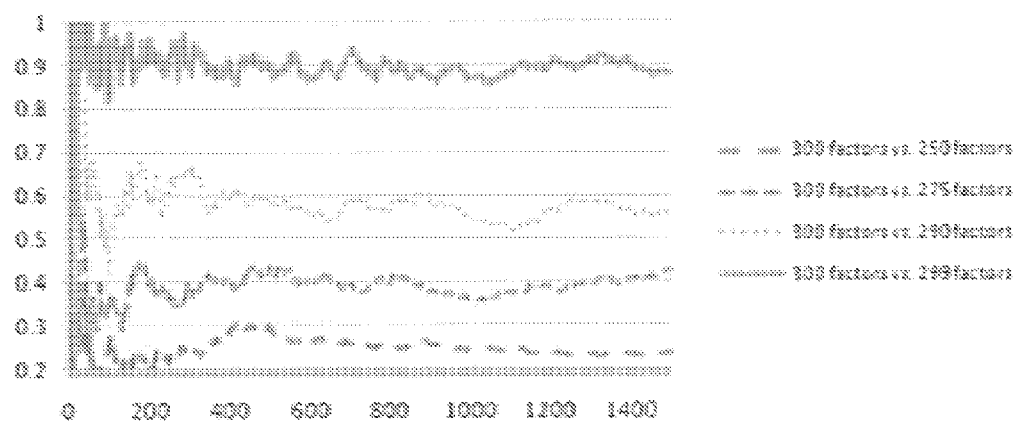
FIG. 5 depicts the permutational similarity between for different factors for the top T elements for T≤1500 according to an embodiment of the invention.

Permutational Similarity (PS)—While combinatorial similarity only considers the overlap of the top T neighbors, permutational similarity further considers the order of the top neighbors. The concept of PS is identical with sequence alignment in bioinforrnatics when gene sequences are compared. The differences here are: (1) the items in the sequence never repeat; (2) T is a variable so the length can be adjusted; (3) the terms can be limited to a special category (such as glossary terms in physics); and (4) the shape of the curve is of particular interest. FIGS. 4 and 5 depict such curves for T≤1500.

Quantitative Similarity (QS)—Combinatorial similarity and permutational similarity are based on algebraic properties of the induced semantic structure as a partial order. QS is based on the quantitative property of the nearest neighbor. QS can be computed according the following method. For a given T, first select all common terms in the two lists and then compute a Pearson correlation. Again, when T changes, QS will change, which makes the QS curve depicteds in FIGS. 6 and 7.

There are different ways each of the three measures can be calculated. To illustrate, consider two semantic spaces, A and B (e.g., any two different spaces from the 192 spaces in Table 1 below). ISS can either be pre-computed or entries of ISS can be generated on-demand.

TABLE 1

Examples of LSA Spaces for Evaluation

| Steps That May Have Different Parameters | Number of Options | Options |
| --- | --- | --- |
| Selection of corpora | 2 | TASA vs. published textbooks (e.g., in physics) |
| Processing raw material | 2 | Fixed document size vs. natural paragraphs |
| Obtaining word-document matrix | 2 | SVD vs. ULV decomposition |
| Decomposition | 3 | Keep 200, 300, or 400 dimensions |
| Processing the vectors | 2 | With first dimension vs. without first dimension |
| Similarity computation methods | 2 | Weighted by eigenvalues vs. not weighted by eigenvalues |
| Total LSA spaces for evaluation | 192 | |

In one embodiment, an ISS is generated according to the following steps:

1. Select items from A and B, respectively. The items may not be the same. For example, one may select "doctor" from one semantic space and "patient" from another space.
2. Extract two rows from the ISS of A and B. The extracted rows provide two sets of nearest neighbors—one for each item from its respective semantic space.

Figure 6:
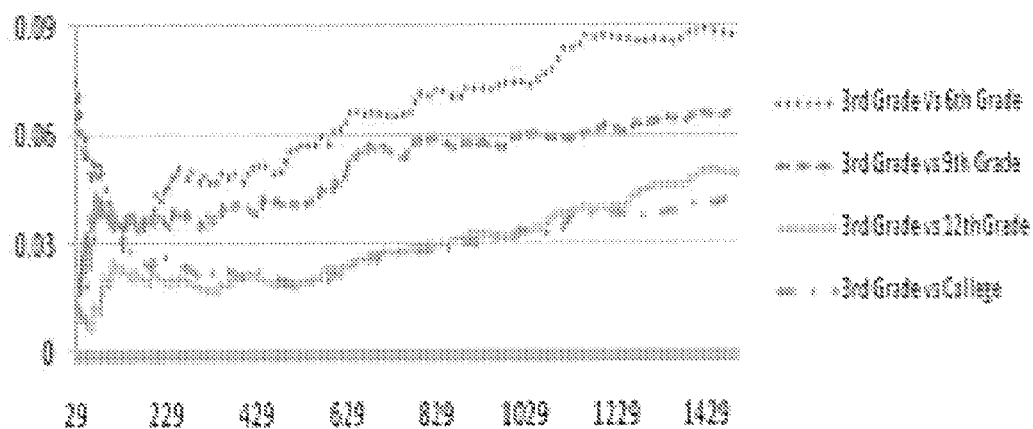
FIG. 6 depicts the quantitative similarity between different corpuses for the top T elements for T≤1500 according to an embodiment of the invention.
Figure 7:
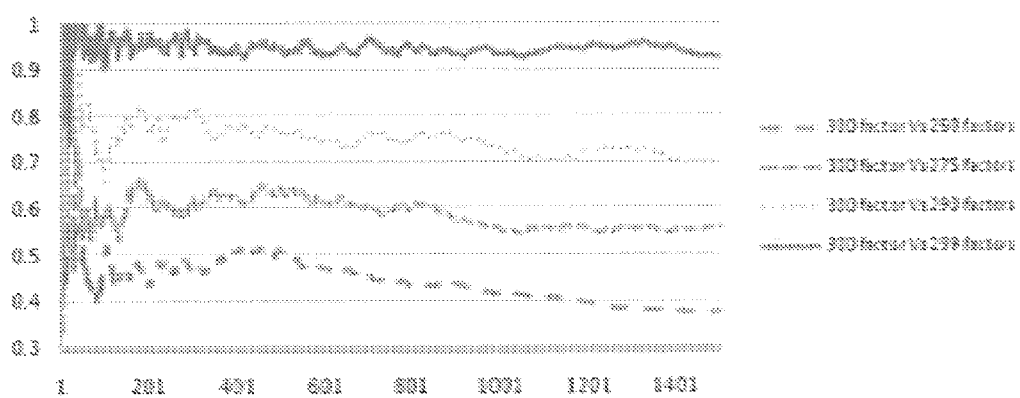
FIG. 7 depicts the quantitative similarity between for different factors for the top T elements for T≤1500 according to an embodiment of the invention.

3. Order the rows based on the numerical value (similarity). Assume a and b are two such ordered lists: a=([$a_1$, $v_1$], ..., [$a_N$, $v_N$]), b=([$b_1$, $u_1$], ..., [$b_N$, $u_N$]), where {$a_i$, ..., $a_N$}={$b_i$, ..., $b_N$}=W (all interested words). $v_i(u_i)$ is the similarity value (in semantic space A (B)) between $a_i(b_i)$ and the item.
   a. For CS, the curve is computed as the ratio of the number of items in the interaction of the top T items from {$a_i$, ..., $a_T$}∩{$b_i$, ..., $b_T$} and the number of items in the union of the top T items from {$a_i$, ..., $a_K$}∪{$b_i$, ..., $b_K$}. When T=N, the CS value is 1. Thus, one can imagine that the CS curve is approaching 1.
   b. For PS, there are different methods explored in the sequence alignment in bioinformatics. The basic requirements for PS in the Hu et al. (2005) framework are: (i) the similarity is 1 if the two orders and {$a_i$, ..., $a_T$} and {$b_i$, ..., $b_T$} are the same, whereas (ii) the similarity is 0 if the two orders are completely reversed. As an example, one of the pair-wise alignments was used to produce the PS curves depicted in FIGS. 4 and 5. Notice that PS can only be computed on a common set of items, so the computation is only concerned with the items in {$a_i$, ..., $a_T$}∩{$b_i$, ..., $b_T$}.
   c. The computation of the QS curve is relatively simple. For each T, get all items in {$a_i$, ..., $a_T$}∩{$b_i$, ..., $b_T$} with associated values $v_i$ and $u_i$ in a=([$a_1$, $v_1$], ..., [$a_T$, $v_T$]), b=([$b_1$, $u_1$], ..., [$b_K$, $u_K$]). The Pearson correlation is then computed to obtain the QS. An example is depicted in FIGS. 6 and 7. (Similarity values are include in FIG. 1.)

An important thread connects each of the similarity measures provided above: all three levels of similarity measures are defined for a single element, and can be extended to a set of elements. For example, the set of physics glossary items can be explored in two semantic spaces, assuming these glossary items are contained in both semantic spaces. For each item, there is a value at each of the three levels. For the set of glossary items, there will be three sets of values—one corresponding to each level of the measures. In this case, statistical properties of the three sets of measures (e.g., mean and standard deviation) can be used to measure semantic similarities for the entire set of glossary items. Usually the three levels of measures can be obtained for any set of items W, where W can be any subset of the intersection of same level elements from the two semantic spaces.

Applications of the Theoretical Framework

The previous section introduced a major concept of induced semantic structure and three levels of similarity measures: combinatorial, permutational, and quantitative similarities between items and between spaces (statistical properties of sets). Embodiments of the invention are based on the formal framework of induced semantic structure and these measures. To illustrate this framework, a simple example of measuring semantic similarity at the item level and outline detailed procedures for measuring semantic similarity at the space level are provided.

Working Example #1

The Meaning of "Life" in Different LSA Spaces

Assume that two LSA spaces $L_1$ and $L_2$ exist with a common set of words W. Two matrices can be obtained by considering near neighbors for all words in W: $S_1$ and $S_2$, such that each corresponds to the similarity measure among all words in W for the two LSA spaces $L_1$ and $L_2$. Thus $S_1$ and $S_2$ are square and symmetric, and have dimension |W|. Note that these two similarity matrices contain all necessary information needed for combinatorial, permutational, and quantitative similarities measures.

In this example, the combinatorial, permutational, and quantitative similarities are computed for the word "life." FIG. 1 lists near neighbors for several LSA spaces. Similarities with the value T=1 ... 1500 were computed and it was observed that the meaning of "life" is most similar between third grade and sixth grade in the TASA corpus. It is very important to note that:
   Values computed from the equations for combinatorial, permutational, and quantitative similarity are functions of the value T. By varying T, a more optimal structure can be induced for a particular semantic space.
   Use of combinatorial, permutational, and quantitative similarity is at the smallest resolution of the LSA spaces, namely, the items. Combinatorial, permutational, and quantitative similarity measures can also be applied to the levels of phrases, sentences, or documents (e.g., one may evaluate the meaning of one document across different spaces).

Measuring Semantic Differences for a Collection of Items Between Semantic Spaces In the previous section, the descriptions for combinatorial, permutational, and quantitative similarity only provide similarity measures between items. In Working Example #1, the descriptions were used to measure the meaning of "life" between different semantic spaces. If a collection of items is considered, numerical values can be obtained for each of the terms. For example, if W is a collection of furniture items, then the combinatorial measure would be a collection of combinatorial similarities for those items between two target semantic spaces. Statistical properties can be obtained to measure the differences. Although W is only a collection of items, it is very important to note the following:
   If W is the overlap of all items in the target semantic spaces, statistical properties of combinatorial, permutational, and quantitative similarity will reflect semantic differences between the target semantic spaces.
   W can be a collection of phrases, sentences, and documents. The invention makes it possible to examine the difference between two completely different semantic spaces with the same corpus at the level of documents.

Applications of the Invention

Given the theoretical framework and methods provided herein, embodiments of the invention will be able to solve the challenges in semantic spaces. The section below, outline three exemplary types of applications: (1) computer implementation; (2) understanding the properties of the similarity curves; and (3) evaluation of semantic spaces.

Computer Implementation

Embodiments of the invention can leverage high capacity computers to carry out a huge amount of computation. Latent Semantic Analysis (LSA) discussed as an example below, but the same procedure can be applied to any other vector-based semantic encoding methods.

By using the computing power available (e.g., a high-performance computing facility), embodiments of the invention can be implemented as a series of small projects including:
   1. Improving LSA—An LSA utility can be created utilizing one or more super-computers. LSA is the most studied type of semantic space that has been used in advanced learning environments, particularly in information retrieval, intelligent tutoring systems, and text analysis. This project will involve a combination of migrating existing LSA algorithms and creating new components that are parameter controlled. With the new LSA generating software, LSA spaces can be generated in a matter of minutes based on any specification of the seven steps provided herein.

2. Generation of nearest neighbors for semantic spaces—Computer programs can be provided that generate neighbors of any given item x. Such a program will utilize significant computing resources because it involves creating an N-by-N matrix whose entries are pair-wise similarity measures within a given layer of a semantic space, where N is the number of items (of the given layer) in the given semantic space. Such a matrix can be used to generate the induced semantic structure and the three levels of similarity measures.

3. Computation of similarity measures—Computer programs can be provided that can compute the three levels of similarity measures for any two elements in the same layer of either the same semantic space or different semantic spaces.

4. Implementation of other semantic spaces—Software can be provided that generates semantic spaces such as HAL as described in C. Burgess et al., "Explorations in context space: Words, sentences, discourse," 25 Discourse Processes 211-57 (1998); NLS as described in (Z. Cai et al., "NLS: A Non-Latent Similarity Algorithm," in "Proceedings of the 26th Annual Meeting of the Cognitive Science Society" 180-85 (2004); and Topics Model, as described in T. L. Griffiths et al., "Topics in semantic representation," 114(2) Psychological Review 211-44 (2007).

Evaluation of Semantic Spaces

Embodiments of the invention can be used to evaluate semantic spaces by: (i) creating ISS for the "best" semantic spaces and (ii) systematically evaluating LSA spaces based on the "best" semantic spaces.

Embodiments of the invention enable the selection of parameters for creating semantic spaces so that the semantic space has the smallest difference from a "gold standard" for a given domain. The first step is to generate a "gold standard" from an already well-established database. It involves creating a portion of the N-by-N matrix (i.e., an induced semantic structure as discussed herein) and computing the similarity between the semantic spaces with a given set of parameters and the "gold standard." The steps outlined below demonstrate how the semantic spaces are created. Although this example demonstrates the creation of semantic spaces using LSA, the same steps apply to other semantic spaces:

1. Word association norms—Word association norms specify the strength of association (a numerical value) between word pairs. The information contained in the word association norms may not be enough for the whole N-by-N matrix that is discussed herein. The comparison between a semantic space and the "gold standard" can be achieved by selecting W and T so that all information from the word association norms can be used. There are several well-collected databases on association norms. The Edinburgh Associative Thesaurus contains 8,400 stimulus words and 55,732 words in total. Another database is the University of South Florida Word Association, Rhyme and Word Fragment Norms, collected by Nelson, McEvoy, and Schreiber and available at http://w3.ustedu/FreeAssociation/. It contains 5019 stimulus words and about 750,000 responses from more than 6,000 participants.

2. WordNet—WordNet is a lexical reference system developed by the Cognitive Science Laboratory at Princeton University. WordNet organizes English nouns, verbs, adjectives, and adverbs into synonym sets, each representing one underlying lexical concept. The synonym sets are linked by different relations, such as antonyms, hypernyms, entailments, etc. The WordNet relations can be used to derive other relations. For example, a hypernym is a relation specifying that a word is a kind of another word (e.g., a "chair" is a kind of "seat"). A hypernym-linked relation can be derived between to two words that share a same hypernym. Thus, "chair" and "sofa" have a hypernym-linked relation because they share the hypernym "seat," as do "chair" and "table" because they share the hypernym "furniture." With such relations, the semantic space can be tested to see how a space or similarity measure predicts a given relation.

3. Microsoft Paraphrase database—The Microsoft Research Paraphrase Corpus as discussed in W. B. Dolan, "Unsupervised construction of large paraphrase corpora: exploiting massively parallel news sources," in "COLING '04: Proceedings of the $20^{th}$ International Conference on Computational Linguistics" 350-56 (2004) will be used to select semantic spaces at the sentence level. This corpus contains 5,801 sentence pairs that have been judged to be either semantically equivalent or semantically nonequivalent. Three human raters produced judgments, with an average inter-rater reliability of 83%. Approximately 67% of the sentence pairs were found to be equivalent. Since the non-equivalent pairs overlap in both information content and wording, discrimination is a difficult task. All sentence pairs were extracted from online news sources over a period of several months.

4. Domain experts—Domain experts will contribute detailed associations among a carefully selected set of words. Specifically, association strength in a set of glossary terms in physics will be obtained from professors and graduate students. Based on the association strength among the glossary terms, the induced semantic structure will be created. The induced semantic structure will be used as a "gold standard" to select the best set of parameters for a semantic space. For example, by applying appropriate local weighting (11, as in Equation (1)) that specifically emphasizes the domain of physics, an LSA space can be generated from TASA to use in the physics version of the AutoTutor software.

To systematically evaluate LSA spaces, LSA spaces can be generated with different sets of parameters. Parameters can be varied according to the open questions identified herein. This involves creating a large number of LSA spaces (e.g., utilizing the permutations detailed in Table 1 herein) and computing pair-wise comparisons between the LSA space and the "best" semantic spaces. In each comparison, the induced semantic space (ISS) of LSA will be compared to the ISS of the target semantic spaces at three level of similarity measures described herein. There are three similarity curves for each term (for example, the semantic similarity of "life" between different spaces). The comparisons between spaces are statistical properties of the set of similarity values, which is also determined by W (the set of items that are common to both spaces to compare).

There are three possible cases:
1. W is a collection of all the words;
2. W is the set of words with global weighting $g_i$ (as discussed in the context of Equation (1)) exceeding a certain threshold; or
3. W is a set of domain-specific (e.g., physics) glossary items.

It is possible to consider other variations. For example, considering W (a set of glossary terms from physics), the semantic similarity between twelfth grade and the first year of college TASA corpus conditioned on W would be the "average" of similarity curves for all the terms in W.

Importance of the Invention

Because semantic spaces are a core component of advanced information retrieval (AIR), advanced learning environments (ALE), and computerized text analysis (CTA), embodiments of the invention will improve the efficiency and quality of these systems. The invention is a major innovation in advancing research in semantic spaces that will significantly broaden the current capabilities of researchers in evaluating written texts.

Methods of Evaluating Semantic Differences

Referring now to FIG. 8, a method 800 of evaluating semantic differences between a first item in a first semantic space and a second item in a second semantic space is provided.

In step S802, a first ordered list of N nearest neighbors of the first item within the first semantic space is calculated.

In step S804, a second ordered list of N nearest neighbors of the second item within the first semantic space is calculated.

A list of nearest neighbors is available for a given semantic space through services such as the LSA @ CU Boulder website available at http://lsa.colorado.edu. Nearest neighbors for any given word in a given semantic space are obtained by computing the semantic similarity of given word with all other words in the semantic space. For example (as depicted in FIG. 1), the nearest neighbors for the word "life" is a list of words, with their semantic similarity values with "life." An example of such a list of 100 neighbors for "life" can be obtained at http://www.dsspp.com/base?json={"text":"life", "minStrength":0.0, "minWeight":0.0,"ttop":100,"etop":100, "format":"json","domain":" ", "SS":"tasalsa"}.

In step S806, a plurality of similarity measures are computed between the first n nearest neighbors of the first item and the first n nearest neighbors of the second item. Parameters n and N are positive integers, wherein 1≤n≤N. The similarity measures can include one or more selected from the group consisting of: combinatorial similarity, permutational similarity, and quantitative similarity. The similarity measures can be a uniform type of similarity measure (i.e., all of the similarity measures can be of the same type). Alternatively, a variety of similarity measures can be utilized.

The number of similarity measures be can be, for example, equal to the number of nearest neighbors (i.e., N). For example, a similarity measure can be computed for each iteration for 1≤n≤N.

The first and/or the second item can be selected from the group consisting of: words, phrases, and sentence. The first item and the second item can be of the same type or different type.

Methods of Identifying Related Sets of Items in Semantic Spaces

Referring now to FIG. 9, a method 900 of identifying a first set of items from a first semantic space that are semantically related to a second set of items from a second semantic space is provided.

In step S902, an induced semantic space is generated for the first semantic space. The induced semantic space is represented as a square matrix in which each matrix entry (i, j) is a numeric representation of an association strength between item i and item j in the first set of items. The number of rows and the number of columns is generally equal to the number of items in a semantic space. The term "items" is used broadly and can, for example, include words, phrases, sentences, and the like as discussed in X. Hu et al., "Similarity between semantic spaces," in "Proceedings of the 27th Annual Meetings of the Cognitive Science Society" 995-1000 (B. Bara, ed. 2005).

An induced semantic structure for a given semantic space is a matrix of N-by-N, where N is the number of words/tokens considered in the semantic space. N can be the number of all words, or can be a number that corresponds to a subset of the words in a semantic space. The entry of the induced semantic structure (i,j) is the similarity between word i and word j. For example, if in a given semantic space, the word "life" is indexed 3000, and the word "death" is indexed 4000, and the semantic similarity between "life" and "death" is 0.4624, then the entry (3000,4000) in the induced semantic structure will have the value 0.4624. All other entries of the N-by-N matrix can be computed in the same way.

It is often the case that not all N-by-N entries are used. Instead, only a portion of the induced semantic structure will sometimes be used in computation.

In step S904, all entries in the matrix having a similarity value below a defined replacement threshold are set to 0. The threshold can be determined based on the distribution of all similarity values. For example, the threshold can be x standard deviations (sd) away from the mean value of the distribution. The parameter x can be −1 (i.e., the threshold is 1 standard deviation below the mean), 0 (i.e., the threshold is at the mean of the distribution), or 1 (i.e., the threshold is 1 standard deviation above the mean similarity values). As a result, the induced semantic space (ISS) becomes a sparse matrix (especially when x is positive and large) with only a small number of non-zero entries.

In step S906, e items having the highest value entries from the j columns are selected, wherein e is any integer from 1 to N. For example, if e is 100, the top 100 nearest neighbors will be selected.

In step S908, the e selected items are ranked by their association strength values.

In step S910, a similarity measure is calculated between each of the n items selected from the first semantic space and each of the n items selected from the second semantic space. The similarity measure can be one or more selected from the group consisting of: combinatorial similarity, permutational similarity, and quantitative similarity.

In step S912, the similarity measures for each of the n items selected from each of the n items selected from the first semantic space and each of the n items selected from the second semantic space are aggregated to produce an aggregate similarity measure for the n items selected from each of the for each of the n items selected from each of the n items selected from the first semantic space and each of the n items selected from the second semantic space. For example, the similarity measures can be aggregated using various statistical techniques such as calculating the mean and standard deviation for the set of similarity measures. Additionally, the aggregate similarity measure can be expressed as a curve by varying parameters e or n.

Implementation in Hardware and/or Software

The methods described herein can be implemented on general-purpose or specially-programmed hardware or software. For example, the methods can be implemented by a computer-readable medium. The computer-readable medium can be non-transitory and/or tangible. For example, the computer readable medium can be volatile memory (e.g., random access memory and the like) or non-volatile memory (e.g., read-only memory, hard disks, floppy discs, magnetic tape, optical discs, paper table, punch cards, and the like).

INCORPORATION BY REFERENCE

All patents, published patent applications, and other references disclosed herein are hereby expressly incorporated by reference in their entireties by reference.

EQUIVALENTS

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, computers, clients, servers and the like) shown as distinct for purposes of illustration may be incorporated within other functional elements, separated in different hardware or distributed in a particular implementation.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

The invention claimed is:

1. A method of identifying a first set of items from a first semantic space that are semantically related to a second set of items from a second semantic space, the method comprising:
   generating an induced semantic space for the first semantic space, the induced semantic space represented as a square matrix in which each matrix entry (i, j) is a numeric representation of an association strength between item i and item j in the first set of items;
   setting matrix entries below a defined replacement threshold to 0;
   selecting e items having the highest value entries from the j columns;
   ranking the e items by association strength entry values;
   selecting n items having the highest value entries from the e items;
   calculating a similarity measure between each of the n items selected from the first semantic space and each of the n items selected from the second semantic space; and
   calculating an aggregate similarity value from the similarity measures between each of the n items selected from the first semantic space and each of the n items selected from the second semantic space.

2. The method of claim 1, wherein the similarity measure includes one or more selected from the group consisting of: combinatorial similarity, permutational similarity, and quantitative similarity.

\* \* \* \* \*